United States Patent
Abdallah, Jr. et al.

(10) Patent No.: US 8,939,184 B2
(45) Date of Patent: Jan. 27, 2015

(54) RUBBER COMPOSITION AND PNEUMATIC TIRE USING SAME

(75) Inventors: David G. Abdallah, Jr., Tallmadge, OH (US); Jamie J. McNutt, Tallmadge, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 1483 days.

(21) Appl. No.: 11/957,842

(22) Filed: Dec. 17, 2007

(65) Prior Publication Data

US 2008/0202660 A1    Aug. 28, 2008

Related U.S. Application Data

(60) Provisional application No. 60/876,409, filed on Dec. 21, 2006.

(51) Int. Cl.
*B60C 13/00* (2006.01)
*C08K 5/04* (2006.01)

(52) U.S. Cl.
USPC .......................................... 152/525; 525/366

(58) Field of Classification Search
None
See application file for complete search history.

(56) References Cited

U.S. PATENT DOCUMENTS

| | | |
|---|---|---|
| 3,035,014 A | 5/1962 | Popoff et al. |
| 3,409,586 A | 11/1968 | Oberster |
| 3,424,713 A | 1/1969 | Oberster et al. |
| 3,432,578 A | 3/1969 | Martin |
| 3,542,691 A | 11/1970 | Budd et al. |
| 3,567,664 A | 3/1971 | Haring |
| 3,637,865 A | 1/1972 | Haring |
| 3,644,482 A | 2/1972 | Dexter et al. |
| 3,655,559 A | 4/1972 | Holt |
| 3,663,505 A | 5/1972 | Hoffman |
| 3,839,275 A | 10/1974 | Wilder |
| 5,120,844 A | 6/1992 | Wheeler et al. |
| 5,238,991 A * | 8/1993 | Magnus et al. ............... 524/520 |
| 5,504,135 A | 4/1996 | Ardrizzi et al. |
| 5,834,544 A | 11/1998 | Lin et al. |
| 5,866,171 A | 2/1999 | Kata |
| 5,876,527 A | 3/1999 | Tsuruta et al. |
| 5,931,211 A | 8/1999 | Tamura |
| 5,971,046 A | 10/1999 | Koch et al. |
| 6,103,808 A | 8/2000 | Hashimoto |
| 6,146,520 A | 11/2000 | Gupte et al. |
| 6,248,929 B1 | 6/2001 | Kaimai et al. |
| 6,399,697 B1 | 6/2002 | Takasaki et al. |
| 6,410,816 B2 | 6/2002 | Takasaki et al. |
| 6,822,043 B2 | 11/2004 | Sohnen et al. |
| 6,878,263 B2 | 4/2005 | Kaimai et al. |
| 2002/0000280 A1 | 1/2002 | Scholl |

FOREIGN PATENT DOCUMENTS

| | | | |
|---|---|---|---|
| CA | 2280652 | * | 3/2000 |
| EP | 775719 | * | 5/1997 |

(Continued)

OTHER PUBLICATIONS

Machine translation of JP 2006-83264, Fujiki, H., Mar. 2006.*

(Continued)

*Primary Examiner* — Justin Fischer
(74) *Attorney, Agent, or Firm* — Shaun J. Fox; Arthur Reginelli

(57) ABSTRACT

A tire sidewall may be formed from a composition including a rubber component and a non-ionic surfactant.

26 Claims, 1 Drawing Sheet

(56) References Cited

FOREIGN PATENT DOCUMENTS

| EP | 0 839 891 | A2 | 5/1998 |
|----|-----------|----|--------|
| ES | 2122917 |  | 12/1998 |
| GB | 1035262 |  | 7/1966 |
| JP | 05194790 | * | 8/1993 |
| JP | 2002097369 |  | 4/2002 |
| JP | 2006-83264 | * | 3/2006 |

OTHER PUBLICATIONS

English translation of JP 2006-83264, 2006.*

* cited by examiner

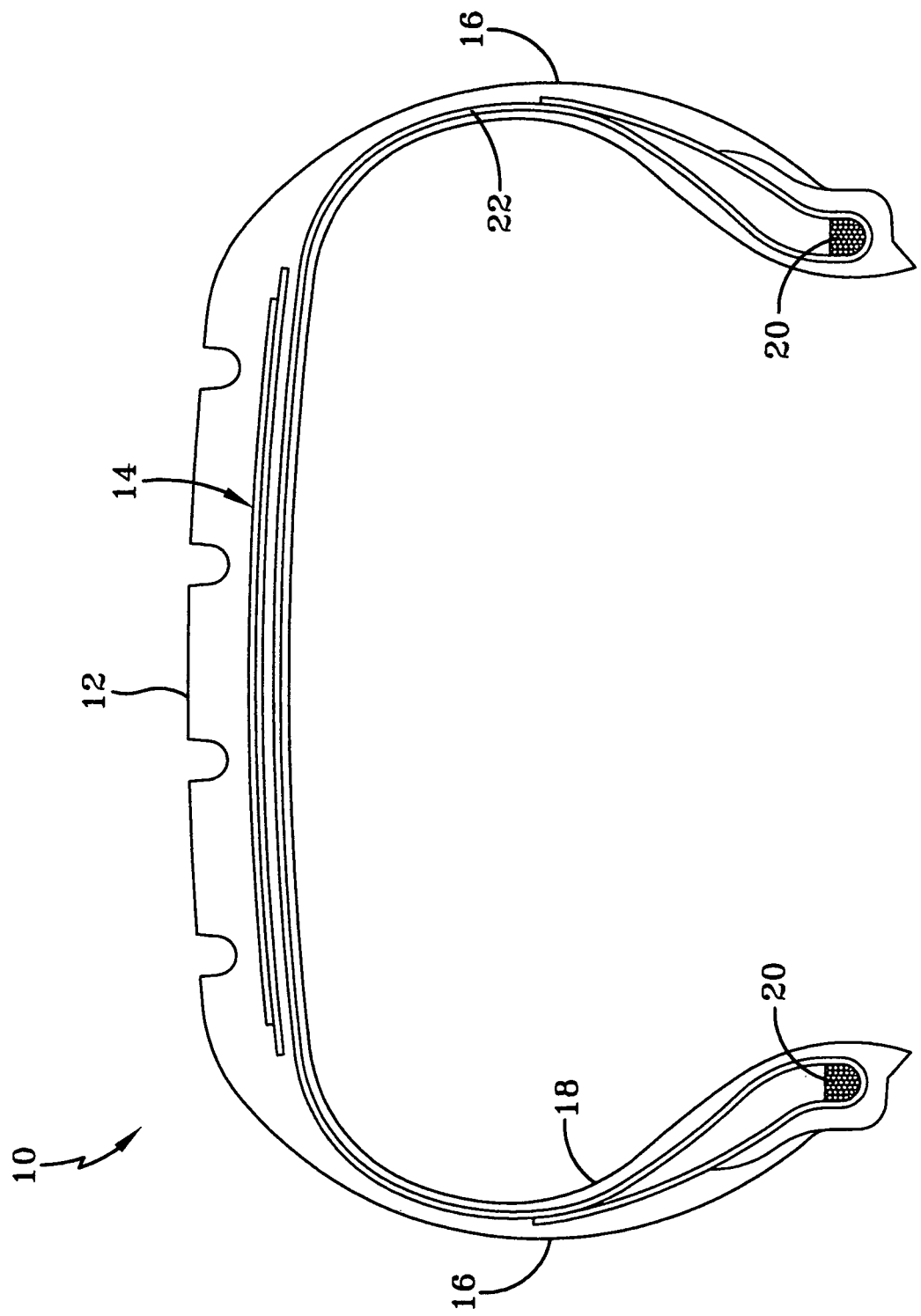

RUBBER COMPOSITION AND PNEUMATIC TIRE USING SAME

This application claims the benefit of U.S. Provisional Patent Application Ser. No. 60/876,409 filed Dec. 21, 2006, which is incorporated herein by reference.

FIELD OF THE INVENTION

One or more embodiments of this invention relate to tire formulations for sidewalls.

BACKGROUND OF THE INVENTION

The appearance of rubber articles can deteriorate in the presence of ozone ($O_3$), an allotropic form of oxygen that exists in the atmosphere. Surface cracks and other cosmetic defects sometimes form.

Petroleum wax, secondary aromatic amines, quinoline, and furan derivatives are some examples of substances that have been incorporated into rubber formulations to reverse or prevent cosmetic deterioration due to ozone. Substances that prevent the effects of ozone are sometimes referred to as antiozonants. However, some antiozonants can migrate to the surface of the rubber article, causing discoloration.

SUMMARY OF THE INVENTION

In one embodiment, the present invention provides a tire sidewall prepared by combining a rubber component and a liquid non-ionic surfactant.

The present invention also includes a tire sidewall formed from a composition comprising a vulcanizable rubber; and a non-ionic surfactant represented by the formula

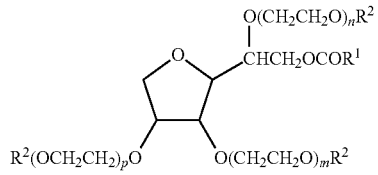

where $R^1$ is a monovalent organic group having a carbon number of from about 11 to about 24, where each $R^2$ is independently hydrogen or a group that may be represented by the formula $C(O)R^1$, and where m, n, and p are independently an integer from 1 to about 10, with the proviso that where $R^1$ has a carbon number of 15 or greater, the sidewall composition further comprises a phenolic resin.

The present invention further provides a tire sidewall comprising a vulcanized rubber component; and a liquid non-ionic surfactant represented by the formula

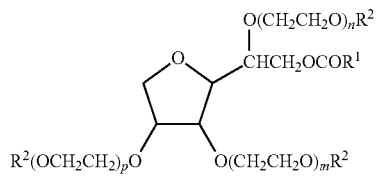

where $R^1$ is a monovalent organic group having a carbon number of from about 11 to about 24, where each $R^2$ is independently hydrogen or a group the may be represented by the formula $C(O)R^1$, and where m, n, and p are independently an integer from 1 to about 10, with the proviso that where $R^1$ has a carbon number of 15 or greater, the sidewall composition further comprises a phenolic resin.

BRIEF DESCRIPTION OF THE DRAWINGS

The FIGURE is a cross-sectional view of a tire according to one or more embodiments of this invention.

DETAILED DESCRIPTION OF ILLUSTRATIVE EMBODIMENTS

In one or more embodiments, the present invention provides a tire sidewall formulation that includes a rubber component and a non-ionic surfactant. Other embodiments provide a tire sidewall having a non-ionic surfactant dispersed therein.

In one or more embodiments, a tire sidewall is prepared from a vulcanizable composition that includes one or more polymers that are capable of being crosslinked or vulcanized; these polymers may be referred to as rubbery polymers. Useful rubbery polymers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped.

In one embodiment, natural rubber is present in the vulcanizable composition in an amount of from about 25 to about 60 percent by weight (wt. %) of the total rubber component of the sidewall formulation. In another embodiment, from about 35 to about 50 percent by weight (wt. %) of the rubber component of the sidewall formulation is natural rubber.

In certain embodiments, the non-ionic surfactant includes surfactants that are in liquid form at standard temperature and pressure. The non-ionic surfactant may include a polysorbate, such as a polyoxyethylene sorbitan fatty acid ester or a polyoxyethylene sorbitol fatty acid ester. Examples of liquid polysorbates include polyoxyethylene sorbitan monolaurate, polyoxyethylene sorbitan monopalmitate, polyoxyethylene sorbitan monostearate, polyoxyethylene sorbitan monooleate, polyoxyethylene sorbitan trioleate, and polyoxyethylene sorbitol tetraoleate.

In one embodiment, the non-ionic surfactant includes compounds that may be represented by the formula

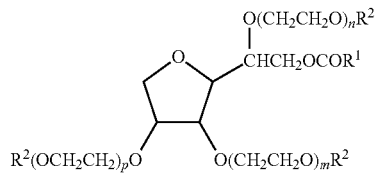

where $R^1$ is a monovalent organic group having a carbon number of from about 11 to about 24, where each $R^2$ is independently hydrogen or a group that may be represented by the formula $C(O)R^1$, and where m, n, and p are independently an integer from 1 to about 10.

In one or more embodiments, the mono-valent organic groups may be hydrocaryl groups such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl group. These hydrocarbyl groups may contain heteroatoms such as, but not limited to, nitrogen, oxygen, boron, silicon, tin, sulfur, and phosphorus atoms. In one or more embodiments, $R^1$ is an alkyl or alkenyl group having a carbon number of from about 11 to about 24. In one or more embodiments, $R^1$ is an alkyl or alkenyl group having a carbon number of from about 11 to 14.

In one or more embodiments, the number average molecular weight of the non-ionic surfactant is less than about 2000 g/mole, in another embodiment, the number average molecular weight of the non-ionic surfactant is less than about 1500 g/mole and in another embodiment, the molecular weight of the non-ionic surfactant is less than about 1300 g/mole. Number average molecular weight may be measured by conventional methods, including gel permeation chromatography and standards such as styrene.

Polysorbates are commercially available. For example, a polyoxyethylene sorbitan monolaurate is available from Lambent Technologies Corp. as Lumisorb™ PSMS-20 LK (Polysorbate 60).

In one or more embodiments, the sidewall composition includes non-ionic surfactant in an amount of from about 0.1 to about 10 parts by weight (pbw) per hundred parts rubber (phr). In one embodiment, the sidewall composition includes non-ionic surfactant in an amount of from about 0.5 to about 8 pbw phr, in another embodiment from about 0.8 to about 5 pbw phr, and in yet another embodiment from about 1 to about 3 pbw phr.

In one embodiment, the sidewall composition includes a softener. Softeners include aromatic oils, naphthenic oils, paraffinic oils, tall oil rosin, phenolic resins, and mixtures thereof.

In one or more embodiments, the amount of softener in the sidewall composition is from about 0 to about 25 pbw phr, in other embodiments, from about 5 to about 20 pbw phr, and in other embodiments, from about 10 to about 19 pbw phr. In certain embodiments, the amount of softener in the sidewall composition is less than about 25 pbw phr, in other embodiments, less than about 20 pbw phr, and in yet other embodiments, less than about 19 pbw phr.

In certain embodiments, the softener has a low polycyclic aromatic (PCA) content. The amount of PCA may be measured by conventional techniques, including, for example, gravimetrically. In one or more embodiments, the softener contains less than about 3 percent by weight PCA, based upon the total weight of softener. Low PCA softeners include mild extraction solvates (MES) and heavy naphthenic oils; see for example U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917, each of which is incorporated by reference. Low PCA oils include those having a glass transition temperature Tg in a range of from about −40° C. to about −80° C. MES oils may have a Tg in a range of from about −57° C. to about −63° C. Heavy naphthenic oils generally have a Tg in a range of from about −42° C. to about −48° C.

Heavy naphthenic oils are available, for example, as Ergon Black Oil C1, Ergon Black Oil C2, Ergon H2000, Cross C2000, Cross C2400, and San Joaquin 2000L.

In one or more embodiments, phenolic resins include synthetic resins obtained by reacting a phenolic compound with an aldehyde. Phenolic compounds include unsubstituted phenol, resorcin, alkylphenols substituted in the p-position by large alkyl groups (C4 to C12), phenolic resins modified by natural resins, and mixtures thereof. Aldehydes include formaldehyde, butyraldehyde, benzaldehyde, salicylaldehyde, acrolein, crotonealdehyde, acetaldehyde, and mixtures thereof.

In certain embodiments, the sidewall composition includes at least about 1 phr of phenolic resin. In one embodiment, the sidewall composition includes phenolic resin in an amount of at least about 2 pbw phr, in another embodiment at least about 2.5 pbw phr. In one or more embodiments, the amount of phenolic resin in the sidewall composition is from about 1 to about 5 pbw phr, and in another embodiments from about 2 to about 3 pbw phr.

In one or more embodiments, a phenolic resin is employed along with one or more additional softeners or blends of softeners.

The sidewall composition of the present invention may include one or more antiozonants. Antiozonants may include hindered phenol stabilizers based on esters of 3-(3,5-di-t-butyl-4-hydroxyphenyl)propionate, N-alkyl,N'-phenyl-p-phenylene diamines, sulphur-containing para-phenylene diamines, aromatic amines based on α-methylstyryl-substituted diphenylamines, and mixtures of an amine component and a sterically hindered phenol component. Antiozonants are described in U.S. Pat. Nos. 3,035,014, 3,644,482, 3,409,586, 3,424,713, 3,542,691, 3,663,505, 3,839,275, 3,432,578, 3,567,664, 3,637,865, 3,655,559, 5,834,544, 5,120,844, and British Patent No. 1,035,262, all of which are incorporated herein by reference.

In one or more embodiments, the sidewall composition includes from about 1 to about 6 phr of antiozonant. In one embodiment, the sidewall composition includes antiozonant in an amount of from about 2 to about 5 pbw phr, and in another embodiment from about 2.5 to about 4 pbw phr.

In certain embodiments, the amount of antiozonant in the sidewall composition can be reduced in comparison to conventional sidewall compositions. In one embodiment, the sidewall composition includes less than about 6 pbw phr of antiozonant, in another embodiment less than about 5 pbw phr of antiozonant, and in yet another embodiment, less than about 4 pbw phr of antiozonant.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

Fillers that may be employed include inorganic and organic fillers. The organic fillers may include carbon black and starch. The inorganic fillers may include silica, aluminum hydroxide, magnesium hydroxide, clays (hydrated aluminum silicates), and mixtures thereof.

These rubber compositions may be cured or crosslinked by employing a multitude of rubber curing agents including, but not limited to, sulfur or peroxide-based curing systems. Curing agents are described in Kirk-Othmer, Encyclopedia of Chemical Technology, 365-468, (3rd Ed. 1982), particularly Vulcanization Agents and Auxiliary Materials, 390-402, and A. Y. Coran, Vulcanization in Encyclopedia of Polymer Science and Engineering, (2nd Ed. 1989), which are incorporated herein by reference. Vulcanizing agents may be used alone or in combination. In one or more embodiments, the process of crosslinking or vulcanizing results in a three dimensional crosslinked infinite rubber network.

The compositions of this invention can be prepared by employing conventional formulation techniques. In one or more embodiments, the rubber mixture may be prepared by forming an initial masterbatch that includes the rubber component and filler. The initial masterbatch may include the non-ionic surfactant and optional phenolic resin. In other embodiments, one or more portions of the non-ionic surfactant and phenolic resin may be added in subsequent mixing stages. This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients including the liquid surfactant and optional phenolic resin can be added during these remills. Rubber compounding techniques and the additives employed therein are disclosed in Stephens, The Compounding and Vulcanization of Rubber, in Rubber Technology (2nd Ed. 1973).

The sidewall compositions can be processed into tire components according to ordinary tire manufacturing techniques including standard rubber shaping, molding and curing techniques. The various tire components can be assembled and cured. Curing or vulcanizing the vulcanizable composition, which may occur at elevated temperatures and/or pressure, results in a vulcanizate or crosslinked rubber matrix with the filler and other components dispersed therein. Pneumatic tires can be made as discussed in U.S. Pat. Nos. 5,866,171, 5,876,527, 5,931,211, and 5,971,046, which are incorporated herein by reference.

An example of a tire according to the present invention is shown in the FIGURE. Tire 10 includes a tread portion 12, a belt package 14, a pair of sidewalls 16, a liner 18, and a pair of axially spaced bead portions 20. Ply 22 extends between bead portions 20. In one or more embodiments, sidewalls 16 are formed from sidewall compositions of the present invention.

In certain embodiments, tire sidewalls according to the present invention have a blacker appearance than those prepared by using non-liquid polysorbate. In one or more embodiments, processability of the sidewall composition is enhanced when liquid polysorbate is employed. In one embodiment, ozone resistance of tire sidewalls according to the present invention is at least equal to the ozone resistance of tire sidewalls prepared by using non-liquid polysorbate. In other embodiments, the ozone resistance is improved.

In one or more embodiments, tire sidewalls prepared from formulations including liquid polysorbate and phenolic resin have improved ozone resistance when compared to tire sidewalls prepared from formulations that do not include phenolic resin. In certain embodiments, ozone resistance may be measured by a dynamic ozone test.

Various modifications and alterations that do not depart from the scope and spirit of this invention will become apparent to those skilled in the art. This invention is not to be duly limited to the illustrative embodiments set forth herein.

What is claimed is:
1. A tire sidewall formed from a composition comprising:
a rubber component including from about 25 to 65 weight percent natural rubber; and
a non-ionic surfactant represented by the formula

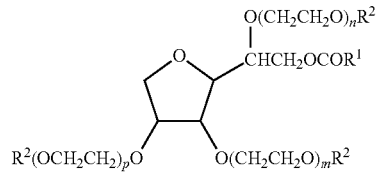

where $R^1$ is a monovalent organic group having a carbon number of from 11 to 14, where each $R^2$ is independently hydrogen or a group that may be represented by the formula $C(O)R^1$, and where m, n, and p are independently an integer from 1 to about 10.

2. The sidewall composition of claim 1, where the non-ionic surfactant includes polyoxyethylene sorbitan monolaurate, polyoxyethylene sorbitan monopalmitate, polyoxyethylene sorbitan monostearate, polyoxyethylene sorbitan monooleate, polyoxyethylene sorbitan trioleate, polyoxyethylene sorbitol tetraoleate, or mixtures thereof.

3. The sidewall composition of claim 1, where $R^1$ is an alkyl or alkenyl group.

4. The sidewall composition of claim 1, wherein the phenolic resin includes a synthetic resin obtained by reacting a phenolic compound with an aldehyde, where the phenolic compound includes an unsubstituted phenol, resorcin, an alkylphenol substituted in the p-position by a (C4 to C12) alkyl group, a phenolic resin modified by a natural resin, or a mixture thereof, and where the aldehyde includes formaldehyde, butyraldehyde, benzaldehyde, salicylaldehyde, acrolein, crotonealdehyde, acetaldehyde, or a mixture thereof.

5. The sidewall of claim 1, where the composition further comprises a mild extraction solvator or a heavy naphthenic oil that contains less than about 3 percent by weight polycyclic aromatic content and has a glass transition temperature of from −40° C. to −80° C.

6. The sidewall of claim 1, where the non-ionic surfactant is in the liquid state at standard temperature and pressure.

7. The sidewall of claim 6, where the sidewall has a blacker appearance than those prepared using non-liquid, non-ionic surfactants.

8. The sidewall of claim 1, where the composition includes less than about 6 pbw phr antiozonant.

9. The sidewall of claim 1, where the composition includes less than about 5 pbw phr antiozonant.

10. The sidewall of claim 1, where the composition includes less than about 4 pbw phr antiozonant.

11. The sidewall of claim 1, where the amount of antiozonant in the composition is reduced in comparison to conventional sidewall compositions.

12. A tire sidewall comprising:
a vulcanized rubber component including 25 to 65 weight percent natural rubber;
a non-ionic surfactant represented by the formula

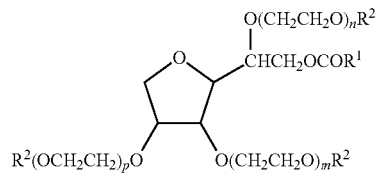

where R¹ is a monovalent organic group having a carbon number of from 11 to 14 or 15 to 24, with the proviso that where R¹ has a carbon number of 15 to 24, the sidewall further comprises a phenolic resin, where each R² is independently hydrogen or a group that may be represented by the formula C(O)R¹, and where m, n, and p are independently an integer from 1 to about 10; and between about 1 and about 6 pbw phr of an antiozonant.

13. The sidewall of claim 12, where the non-ionic surfactant includes polyoxyethylene sorbitan monolaurate, polyoxyethylene sorbitan monopalmitate, polyoxyethylene sorbitan monostearate, polyoxyethylene sorbitan monooleate, polyoxyethylene sorbitan trioleate, polyoxyethylene sorbitol tetraoleate, or mixtures thereof.

14. The sidewall composition of claim 12, where R¹ is an alkyl or alkenyl group.

15. The sidewall of claim 12, where R¹ has a carbon number of from 11 to 14.

16. The sidewall of claim 12, wherein the phenolic resin includes a synthetic resin obtained by reacting a phenolic compound with an aldehyde, where the phenolic compound includes an unsubstituted phenol, resorcin, an alkylphenol substituted in the p-position by a (C4 to C12) alkyl group, a phenolic resin modified by a natural resin, or a mixture thereof, and where the aldehyde includes formaldehyde, butyraldehyde, benzaldehyde, salicylaldehyde, acrolein, crotonealdehyde, acetaldehyde, or a mixture thereof.

17. The sidewall of claim 12, where the sidewall further comprises a mild extraction solvator or a heavy naphthenic oil that contains less than about 3 percent by weight polycyclic aromatic content and has a glass transition temperature of from −40° C. to −80° C.

18. The sidewall of claim 12, where the non-ionic surfactant is in the liquid state at standard temperature and pressure.

19. The sidewall of claim 18, where the sidewall has a blacker appearance than those prepared using non-liquid, non-ionic surfactants.

20. A method for preparing a tire, the method comprising the steps of:
mixing ingredients including at least one rubber component, a filler, optionally a non-ionic surfactant, and optionally a phenolic resin, to form a first mixture, where the rubber component includes 25 to 65 weight percent natural rubber;
cooling the first mixture;
further mixing the first mixture, optionally with additional ingredients including a non-ionic surfactant and optionally a phenolic resin, to form an intermediate mixture, with the proviso that at least one of the ingredients mixed to form the first mixture or the additional ingredients added to form the intermediate composition includes a non-ionic surfactant represented by the formula

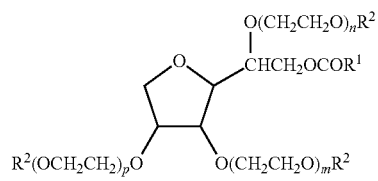

where R¹ is an alkyl group or an alkenyl group having a carbon number of from 11 to 14, where each R² is independently hydrogen or a group that may be represented by the formula C(O)R¹, and where m, n, and p are independently an integer from 1 to about 10;
adding ingredients including a curative to the intermediate mixture to form a vulcanizable mixture;
mixing the vulcanizable mixture;
forming the vulcanizable mixture into a tire sidewall component;
building a tire by including the tire component; and
curing the tire.

21. The method of claim 20, where the non-ionic surfactant includes polyoxyethylene sorbitan monolaurate, polyoxyethylene sorbitan monopalmitate, polyoxyethylene sorbitan monostearate, polyoxyethylene sorbitan monooleate, polyoxyethylene sorbitan trioleate, polyoxyethylene sorbitol tetraoleate, or mixtures thereof.

22. The sidewall composition of claim 20, where R¹ is an alkyl or alkenyl group.

23. The method of claim 20, wherein the phenolic resin includes a synthetic resin obtained by reacting a phenolic compound with an aldehyde, where the phenolic compound includes an unsubstituted phenol, resorcin, an alkylphenol substituted in the p-position by a (C4 to C12) alkyl group, a phenolic resin modified by a natural resin, or a mixture thereof, and where the aldehyde includes formaldehyde, butyraldehyde, benzaldehyde, salicylaldehyde, acrolein, crotonealdehyde, acetaldehyde, or a mixture thereof.

24. The method of claim 20, where one of the ingredients mixed to form the first mixture or the additional ingredients added to form the intermediate composition is a mild extraction solvator or a heavy naphthenic oil that contains less than about 3 percent by weight polycyclic aromatic content and has a glass transition temperature of from −40° C. to −80° C.

25. The method of claim 20, where the non-ionic surfactant is in the liquid state at standard temperature and pressure.

26. The method of claim 25, where the sidewall component has a blacker appearance than those prepared using non-liquid, non-ionic surfactants.

* * * * *